United States Patent [19]

Blackstone et al.

[11] 4,169,758

[45] Oct. 2, 1979

[54] NUCLEAR REACTOR VESSEL INSPECTION APPARATUS

[75] Inventors: Eugene G. Blackstone, Canton, Ohio; Richard A. Lofy, Elm Grove, Wis.; Lawrence P. Williams, Wadsworth, Ohio

[73] Assignee: The Babcock & Wilcox Company, New York, N.Y.

[21] Appl. No.: 845,742

[22] Filed: Oct. 26, 1977

[51] Int. Cl.² ............................................. G21C 17/00
[52] U.S. Cl. .............................. 176/19 R; 176/19 LD
[58] Field of Search ................... 176/19 R, 19 LD, 30

[56] References Cited

U.S. PATENT DOCUMENTS

| | | | |
|---|---|---|---|
| 3,664,922 | 5/1972 | Diwinsky et al. | 176/19 R |
| 3,756,915 | 9/1973 | Matveevich et al. | 176/19 R |
| 3,780,571 | 12/1973 | Wiesner | 176/19 R |
| 3,809,607 | 5/1974 | Murray et al. | 176/19 R |
| 3,862,578 | 1/1975 | Schluter | 176/19 R |
| 3,901,073 | 8/1975 | Dent et al. | 176/19 R |
| 3,943,756 | 3/1976 | Aubert et al. | 176/19 R |

Primary Examiner—Samuel W. Engle
Assistant Examiner—S. A. Cangialosi
Attorney, Agent, or Firm—John F. Luhrs; J. M. Maguire

[57] ABSTRACT

Apparatus for the in situ inspection of a nuclear reactor vessel to detect the location and character of flaws in the walls of the vessel, in the welds joining the various sections of the vessel, in the welds joining attachments such as nozzles, elbows and the like to the reactor vessel and in such attachments wherein an inspection head carrying one or more ultrasonic transducers follows predetermined paths in scanning the various reactor sections, welds and attachments.

12 Claims, 3 Drawing Figures

NUCLEAR REACTOR VESSEL INSPECTION APPARATUS

This invention relates to apparatus for the detection of flaws in a nuclear reactor vessel and more particularly to apparatus wherein the interior surface of the vessel is scanned to detect defects in the walls of the vessel by one or more ultrasonic transducers remotely controlled to follow the contours of the various surfaces of the vessel.

One object of the invention is to provide such an apparatus readily adapted to scan reactor vessels of various sizes and configurations.

A further object of the invention is to provide such an apparatus wherein the scanning operation can be accomplished at relatively high speeds thereby minimizing the down time of the reactor.

Still another object of the invention is to provide such an apparatus which is portable and can be moved from one reactor vessel to another.

A further object of the invention is to provide such an apparatus capable of examining the entire reactor vessel by means of a single articulated scanning head.

Still another object of the invention is to provide such an apparatus which may be calibrated in real time before, after or at specified intervals during the scanning operation.

A further object of the invention is to provide such an apparatus whereby visual examination, by means of closed circuit television, of the internal surfaces of the reactor vessel may be made.

These and other objects of the invention will be apparent from the following description when considered in connection with the drawings, in which;

IN THE DRAWINGS

DETAILED DESCRIPTION

Figure 1:
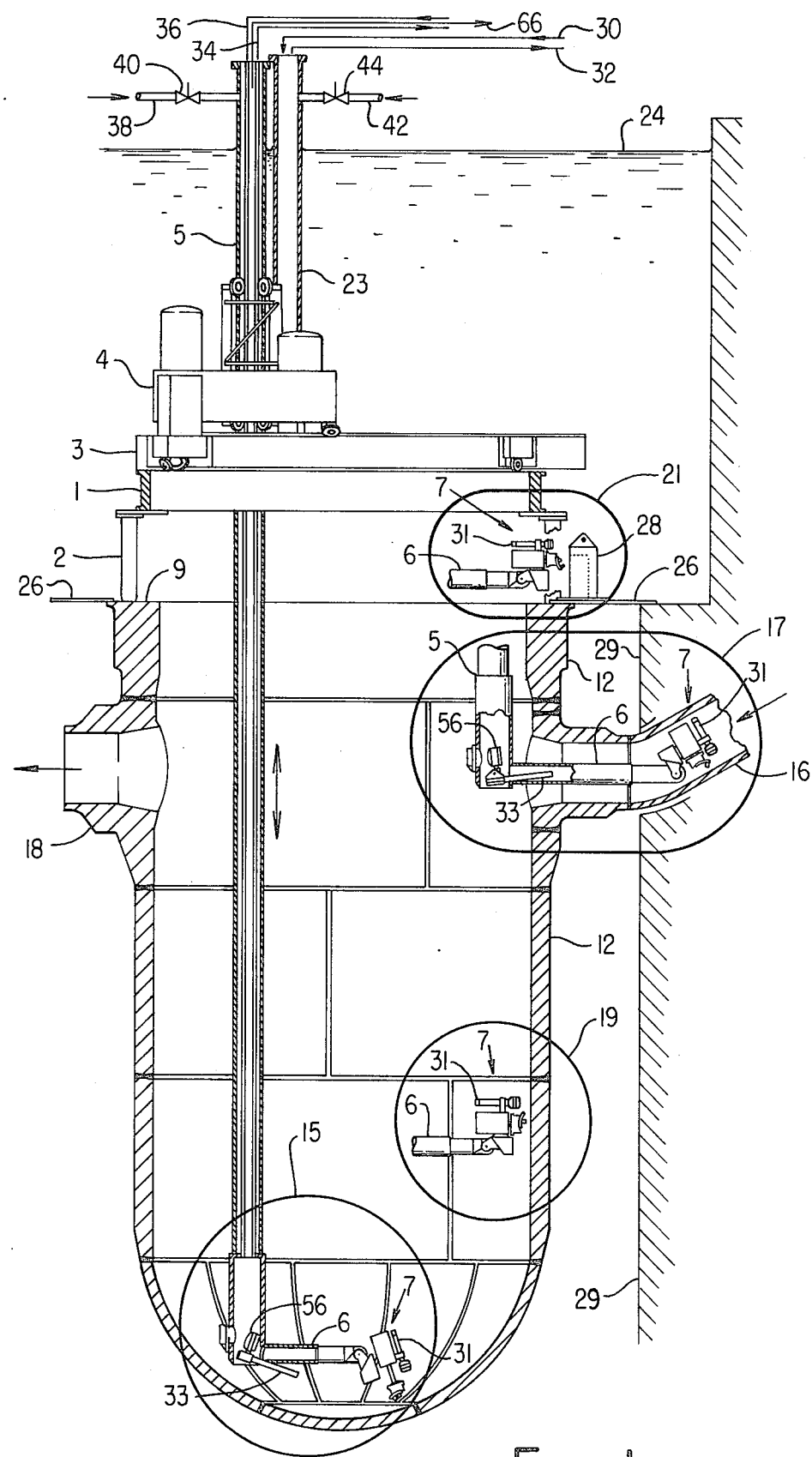
FIG. 1 is a schematic elevation view in cross section of a typical reactor vessel in which is incorporated the scanning apparatus of this invention.
Figure 2:
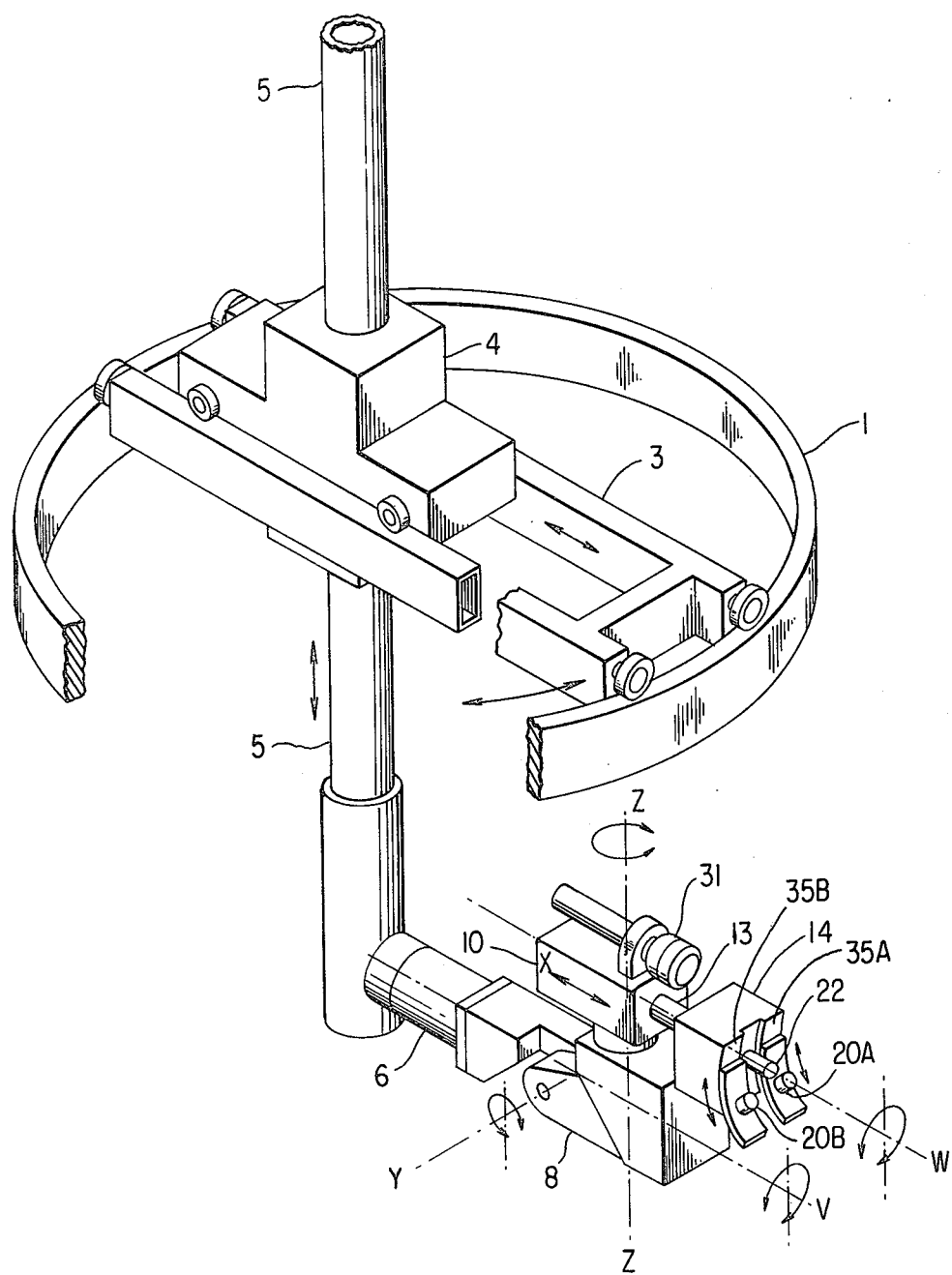
FIG. 2 is a fragmentary isometric view of the scanning apparatus.

Referring to the drawings wherein like reference characters designate like or corresponding parts throughout the several views there is shown in cross section a nuclear reactor vessel 12, which may be taken as representative of the vessel for a boiling water or a pressurized water reactor and which is made up of a plurality of welded sections. The vessel 12 is surrounded by suitable shielding as schematically illustrated at 29.

During normal operation the water coolant flows into the reactor vessel through one or more inlet nozzles 16 and is discharged therefrom through one or more outlet nozzles 18. During both normal operation and the refueling operation the reactor vessel is maintained full of coolant. It is with the fuel assemblies removed from the reactor vessel that a complete inspection can be made; however, it will be apparent as the description proceeds, that even with the fuel assemblies in place a limited inspection can be made of the reactor vessel above the fuel assemblies.

The safety factors relative to a nuclear installation dictate that the soundness of the reactor vessel and welds be periodically determined. Because of the vessel's high radiation environment it is necessary that the examinations necessary to determine the vessel's soundness make use of equipment which can be remotely controlled from a location away from the hostile environment in and surrounding the vessel. Further, so that the examinations may be expeditously performed it is desirable that the interior surface of the vessel, including the vessel welds and attachments, be scanned by suitable transducers, such as ultrasonic transducers, by automatic contour control which enables the scanners to follow the several contours of the vessel and welds in accordance with predetermined programs.

Figure 3:
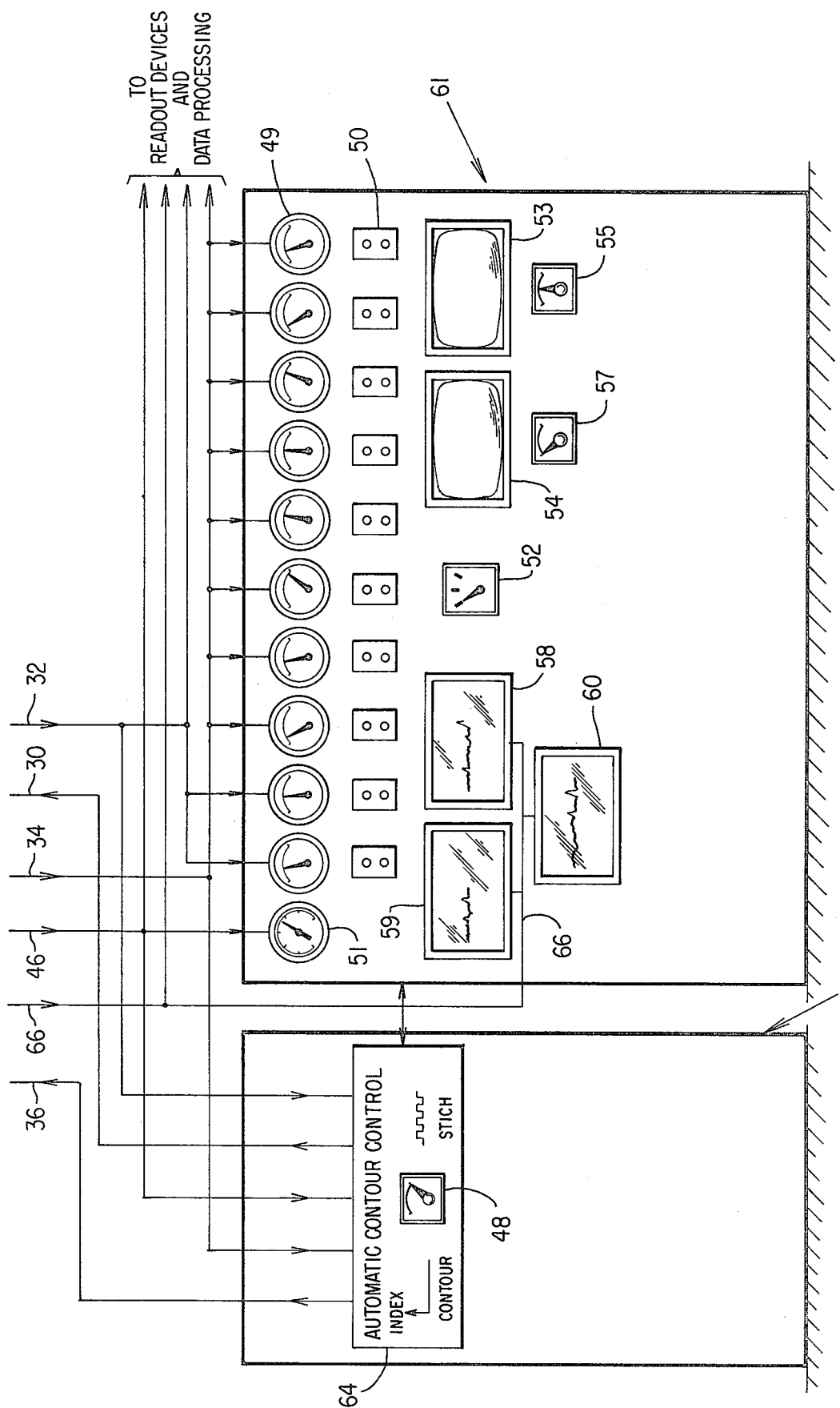
FIG. 3 is a front elevation view of an operator and a control console for the remote control of the apparatus shown in FIGS. 1 and 2.

In accordance with this invention an inspection head, generally indicated at 7, hereinafter to be described in more detail, follows predetermined scanning paths as programmed in the remotely located contour control unit 64 located in the control panel 62 (FIG. 3). A horizontal boom 6, carrying the inspection head 7, is angularly positionable about its longitudinal axis V—V and is carried by a vertically positionable mast 5 supported in a radially positionable carriage 4, in turn carried by a bridge 3 rotatably mounted on a ring girder 1, supported by legs 2 from the upper vessel flange 9.

Incorporated in the inspection head 7 are angle-beam ultrasonic send and receive transducers 20A and 20B and a straight beam send and receive transducer 22, thereby providing examination of a weld, for example, at two distinct angles as well as a straight-beam examination of the weld and base metal. The angle-beam transducers 20A and 20B are angularly positionable along ways 35A and 35B respectively to thereby vary the angle of incidence of the ultrasonic waves relative to the surface of the vessel 12 as may be required to meet the requirements of any one or more specific scans. Conveniently, the ways 35A and 35B and straight-beam transducer 22 are mounted on a housing 14, carried on a shaft 13 mounted for axial positioning along the axis X—X and angular positioning around the axis W—W in a housing 10 which is mounted on a housing 8 for angular positioning about the axis Z—Z. The housing 8 is mounted on the boom 6 for angular positioning about the axis Y—Y.

In the interest of clarity and brevity the servomotors and the position feedback units, such as encoders, to provide linear positioning of the mast 5 and of the inspection head 7 along the X—X axis have not been shown. Similarly, the servomotors and feedback units for angularly positioning of the bridge 3 relative to the ring girder 1 and the angular positioning of the various components about the V—V, W—W, Y—Y and Z—Z axes have not been shown as such units are well known in the art and the design details thereof form no part of the present invention.

As shown, a cable 30 carries the control connections from the contour control through a snorkel tube 23 to the servomotors providing the rotational movement of the bridge 3 and the linear movement of the mast 5 and carriage 4, with signals corresponding to the actual positions thereof being transmitted by means of feedback units to the contour control 64 through a cable 32. The connections from the contour control unit 64 are carried through the mast 5 to the servomotors providing linear motion of the inspection head 7 along the X—X axis, and angular motion of the various components about the V—V, W—W, Y—Y and Z—Z axes, with the signals corresponding to the actual positions of these components being transmitted, by means of feedback units, to the contour control unit 64 by a cable 36 running through the mast 5. The connections between the ultrasonic transducers 20A, 20B and 22 and the CRT display units 58, 59 and 60 are also carried through the mast 5.

Upon completion of one scan path, a parallel path can be scanned by automatically indexing a predetermined amount one or more of the available motions. Thus when scanning the ligament surface of the vessel flange 9, with the transducers focused thereon, the bridge 3 may be rotated and at the beginning of each revolution the carriage 4 may be radially indexed a predetermined amount. In some instances as, for example, in scanning a circular weld as shown within the identification circle 15, the bridge 3 can be rotated and at the completion of each revolution the carriage 4, mast 5 and inspection head 7 each indexed predetermined amounts. Other typical positions of the inspection head 7 in scanning specific sections of the reactor vessel are identified by the circles 17 and 19.

To provide visual inspection of the reactor vessel there is mounted on the inspection head 7 a television camera 31 and on the mast 5 a television camera 33 which is angularly positionable by the remote manual switch 57. The television cameras 31 and 33 are connected to the receivers 53, 54 respectively. The connections between the cameras 31, 33 to the receivers 53, 54 are carried through the mast 5. A high intensity lamp 56 mounted on the television camera 33 provides the illumination of the area of the reactor vessel on which the cameras are focused.

A calibration unit shown within the circle 21 adapted to be removably mounted on the ligament face of flange 9, but shown, for illustrative purposes, moved from its operating position, comprising a standardization block 28 to which the inspection head 7 may be positioned before, at prescribed intervals during, and after an inspection to check the calibration of the apparatus and recalibrate if necessary.

As heretofore described, the reactor vessel is full of coolant during an inspection. While through the use of seals leakage of coolant into the mast 5, boom 6 and inspection head 7 may be minimized, to assure a dry atmosphere air under pressure is admitted to a conduit running through the mast 5 from any suitable source (not shown) through a pipe 38 and a pressure reducing valve 40. Similarly, air under pressure is admitted to a conduit running through the snorkel tube 23 through a pipe 42 and a pressure reducing valve 44. A controlled flow of air through the mast 5 and snorkel tube 23 is maintained by suitable discharge ports. Therefore in addition to maintaining a dry atmosphere within the various enclosures the flow of air serves to maintain the temperature of the components making up the apparatus at a reasonable value and further, by suitable sampling means any contamination of the atmosphere within the housings can be detected.

In the automatic contour control unit 64, signals corresponding to the actual positions of the various movable components are compared with signals corresponding to desired positions and corrective signals transmitted to the various servomotors. As well known in the art, by incorporating, as required, control functions, such as speed control, automatic reset, breaking and the like, a predetermined scanning path will be followed. Further, constraints may be incorporated in the contour control unit to prevent any of the motions exceeding predetermined travel limits.

As diagrammatically indicated on the panel 62, a switcb 48 is provided to transfer the control from the so called line contour control wherein the followed path is indexed in one direction or the other a predetermined amount following each pass, to a so called stitch control wherein the inspection head 7 is oscillated back and forth across the predetermined path.

Mounted on an operator's panel 61 is an array of instruments and controls for operator guidance in monitoring the operation of the apparatus and for taking such corrective actions as may be required. An array of indicators 49 are provided to give a visual indication of the actual positions of all of the components under the control of the contour control unit 64. By means of a transfer switch 52 control of the apparatus may be transfered from automatic to an interactive mode in which motions are controlled by the operator through the contour control unit 64, or to a fully remote manual control mode wherein positioning of the various servomotors is controlled by means of the forward-reverse stations 50. The output signals from the ultrasonic transducers 20A, 20B and 22 are displayed on CRT units 58, 59 and 60. As heretofore noted the interior surface of the reactor vessel and the welds associated therewith may be visually displayed on television screens 53, 54.

Compensation for changing conditions within the reactor vessel may be introduced into the contour control unit 64. As an example, as the ratio of sound velocity in water to the sound velocity in steel varies with temperature there is shown inputting to the contour control unit 64 and to a temperature indicator 51 through leads 46, a signal corresponding to the temperature of the coolant within the reactor vessel derived from a temperature responsive device such as a resistance thermometer or thermocouple (not shown). This signal through suitable circuitry will provide compensation in the control for errors which would otherwise be introduced into the apparatus.

As shown, relevant signals as transmitted through cables 34, 66, 32 and 46 are transmitted to readout and data processing equipment (not shown).

We claim:

1. In an apparatus for scanning the interior surfaces of a vertical cylindrical nuclear reactor vessel filled with collant and having an upper vessel flange and the top closure head removed to expose said flange, the combination comprising, a ring girder supported from the open end, a rotatable bridge spanning said girder, a carriage supported by and linearly movable in forward and reverse directions along said bridge, an axially movable vertical mast supported in said carriage depending into the reactor vessel, a boom supported by said mast extending at a right angle therefrom toward the cylindrical surface of the reactor vessel, and an articulated ultrasonic transducer inspection head carried by said boom axially aligned with and extending beyond the end of said boom remote from said mast.

2. Apparatus in accordance with claim 1 wherein said inspection head is rotatably supported in said boom.

3. Apparatus in accordance with claim 2 wherein said inspection head is pivotly joined to said boom.

4. Apparatus in accordance with claim 3 wherein said inspection head comprises a base pivotly joined to said boom, a housing rotatably mounted on said base, a shaft supported in and axially movable relative to said housing carrying a second base for supporting a first ultrasonic transducer axially aligned with said shaft.

5. Apparatus in accordance with claim 4 further including a second and a third ultrasonic transducer supported by said second base each independently movable relative to said first transducer.

6. Apparatus according to claim 5 further including means supported by said second base guiding said second and third transducers along an arcuate path when moving relative to said first transducer.

7. Apparatus according to claim 1 wherein said mast is hollow.

8. Apparatus according to claim 1 further including means producing a flow of a gas under pressure through said mast.

9. Apparatus according to claim 6 further including a contour control unit operatively connected to and automatically controlling the positioning of said bridge, carriage, mast and inspection head to thereby cause said inspection head to follow predetermined paths in scanning the interior surface of the reactor vessel.

10. Apparatus according to claim 1 further including a first television camera mounted on said inspection head for scanning the surface of the reactor vessel.

11. Apparatus according to claim 9 wherein said contour control unit includes means constraining the positioning of said bridge, carriage, mast and inspection head to within predetermined limits.

12. Apparatus according to claim 1 further including a second television camera pivotly mounted on said mast in axial alignment with the longitudinal axis of said boom.

* * * * *

UNITED STATES PATENT AND TRADEMARK OFFICE
CERTIFICATE OF CORRECTION

PATENT NO. : 4,169,758
DATED : October 2, 1979
INVENTOR(S) : Eugene G. Blackstone et al.

It is certified that error appears in the above—identified patent and that said Letters Patent is hereby corrected as shown below:

Column 4, line 4, delete "switcb" and insert -- switch --.

Claim 1, lines 5 and 6, delete "from the open end" and insert -- on said flange --.

Signed and Sealed this

Eleventh Day of December 1979

[SEAL]

Attest:

SIDNEY A. DIAMOND

Attesting Officer

Commissioner of Patents and Trademarks